US006670281B2

(12) United States Patent
Luly et al.

(10) Patent No.: US 6,670,281 B2
(45) Date of Patent: *Dec. 30, 2003

(54) HF ETCHING AND OXIDE SCALE REMOVAL

(75) Inventors: Matthew H. Luly, Erie County, NY (US); Rajiv R. Singh, Erie County, NY (US); Charles L. Redmon, Erie County, NY (US); Jeffrey W. McKown, Erie County, NY (US); Robert Pratt, Morris County, NJ (US)

(73) Assignee: Honeywell International Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,359

(22) Filed: Dec. 30, 1998

(65) Prior Publication Data

US 2002/0063106 A1 May 30, 2002

(51) Int. Cl.$^7$ .............................................. H01C 21/302
(52) U.S. Cl. ......................... 438/755; 438/756; 216/28
(58) Field of Search .............................. 216/28, 31, 32; 134/2, 3; 252/79.1–79.4; 438/755–756; 427/255

(56) References Cited

U.S. PATENT DOCUMENTS

| 1,470,772 A | 10/1923 | Simon |
| 2,903,345 A | 9/1959 | Hedley et al. |
| 4,620,934 A | * 11/1986 | Hopkins et al. ............ 252/79.4 |
| 4,749,440 A | * 6/1988 | Blackwood et al. ......... 438/706 |
| 4,971,631 A | 11/1990 | Sallee et al. .................... 134/3 |
| 5,281,318 A | 1/1994 | Tahara ..................... 204/182.4 |
| 5,288,333 A | * 2/1994 | Tanaka et al. ................. 134/31 |
| 5,362,461 A | 11/1994 | Ohmi et al. ................. 423/163 |
| 5,632,966 A | 5/1997 | Van Der Puy et al. ...... 423/484 |
| 5,663,474 A | 9/1997 | Pham et al. ................. 585/721 |
| 5,683,591 A | * 11/1997 | Offenberg ...................... 216/2 |
| 5,705,717 A | 1/1998 | Puy et al. .................... 570/164 |
| 5,716,535 A | * 2/1998 | Lee et al. ....................... 216/99 |
| 5,766,483 A | 6/1998 | Luly et al. ................... 210/670 |
| 5,922,213 A | * 7/1999 | Kumagai et al. ............... 216/2 |
| 6,177,058 B1 | 1/2001 | Singh et al. ................. 423/483 |

FOREIGN PATENT DOCUMENTS

| EP | 99 966 488.1 | 2/2002 |
| ES | 524632 | 6/1984 |
| JP | 58-88142 | 5/1983 |
| JP | 05888142 | 5/1983 |
| RU | 2013406 | 5/1994 |
| WO | WO 95/16740 | 6/1995 |

* cited by examiner

Primary Examiner—Nadine G. Norton
Assistant Examiner—Duy-Vu Deo
(74) Attorney, Agent, or Firm—Synnestvedt & Lechner LLP

(57) ABSTRACT

Methods for etching or removing oxide scale from a substrate by applying a composition containing a polymer and an effective amount of hydrofluoric acid and maintaining the composition on the substrate until the substrate is etched or the oxide scale is removed.

30 Claims, No Drawings

US 6,670,281 B2

HF ETCHING AND OXIDE SCALE REMOVAL

FIELD OF THE INVENTION

The present invention relates to a method for etching patterns on, or removing oxide scale from, substrates with hydrofluoric acid (HF) compositions. More particularly, the present invention relates to etching or removing oxide scale from surfaces with a polymer-thickened HF composition.

BACKGROUND OF THE INVENTION

The glass and electronics industries use large quantities of aqueous HF to etch patterns on different substrates. The metal finishing industries also use large quantities of aqueous HF to remove metal oxide scale during stainless steel production (pickling). Because of the relatively low viscosity of aqueous HF, it is difficult to contain the aqueous HF to the areas where it is applied.

Thus, etching processes employing HF compositions require the use of a mask or resist, particularly when the purpose of the etching is to form a pattern on a surface. With resists and masks, any pattern that is being applied must be fixed, and as a result, varying patterns are precluded.

The low viscosity of aqueous HF solutions also pose a problem for metal oxide removal methods. Maintaining the HF composition in contact with the oxide layer for a sufficient period of time to remove it is problematic, particularly with vertical surfaces.

Thus, a need exists for HF compositions for etching and oxide scale removal HF that do not suffer from the disadvantages of the prior art aqueous HF compositions.

DESCRIPTION OF THE INVENTION AND PREFERRED EMBODIMENTS

These needs are met by the present invention. The invention provides methods for etching and metal oxide scale removal using an HF composition that can be applied as a liquid, paste or gel exactly in the places needed for the specific time needed, and then removed. The HF composition has a viscosity and surface tension that is effective to retard the flow of the material. This eliminates the need for masks or resists when etching, and also increases the surface contact of the HF in the composition with oxide layers to be removed.

The present invention thus provides a method of etching a substrate by applying in the form of a predetermined pattern to the surface of the substrate an HF composition containing a polymer and an amount of HF effective to etch the surface, until the pattern is etched into the surface, and optionally removing the composition.

The present invention also provides a method for removing oxide scale from an oxidizable surface by applying to the oxide scale an HF composition containing a polymer and an amount of HF effective to remove the oxide scale, until the oxide scale is removed, and optionally removing the composition.

In both embodiments, the HF composition may be either rinsed or wiped away with water. Alternatively, the substrate may be heated to remove the HF from the composition, or the composition may be neutralized to stop the etching or oxide scale removal process, before the HF composition is rinsed or wiped away with water. The composition may be recovered from the water, reconstituted with HF, and reused.

The polymer produces high viscosity etching and oxide scale removal compositions that are resistant to flow. Preferably, the polymer is inert, or substantially inert, to HF. The polymer may be a homopolymer, copolymer, or mixtures thereof.

Generally, the polymers used in the invention have weight average molecular weights from about 5,000 to about 10,000,000 daltons. Preferably, polymers with molecular weights are from about 5,000 to about 1,000,000 daltons. A molecular weight between about 50,000 to 500,000 daltons is most preferred. Particularly preferred polymers are water-soluble. "Water-soluble" means any polymer that swells to at least twice its dry volume, or dissolves, with the addition of an excess of water at room temperature.

Water-soluble polymers suitable for use with the present invention include semi-synthetic water-soluble polymers, synthetic water-soluble polymers, and mixtures thereof. Semi-synthetic water-soluble polymers are naturally-occurring water-soluble polymer derivatives. Synthetic water-soluble polymers are water-soluble polymers or their derivatives that are not naturally-occurring. (They are formed only through chemical reactions.)

Both the semi-synthetic and synthetic water-soluble polymers are commercially available. Exemplary commercially-available semi-synthetic water-soluble polymers include, without limitation, cellulose ethers, modified starches, starch derivatives, natural gum derivatives, and mixtures thereof. Illustrative commercially-available synthetic water-soluble polymers include, without limitation, polymers, related polymers, and polymer salts of acrylamide, acrylic acid, ethylene oxide, methacrylic acid, ethacrylic acid, esters of acrylic, methacrylic, and ethacrylic acid, polyethyleneimine, polyvinyl alcohol, polyvinyl acetate, polyvinyl pyrrolidone, and copolymers thereof, as well as copolymers with other monomers, for example, substituted and unsubstituted two to eight carbon atom alpha-olefins such as ethylene, propylene, vinyl chloride, vinylidene chloride, vinyl fluoride, hexafluoropropylene and chlorotrifluoroethylene. Aromatic monomers such as styrene may also be employed.

By related polymer, it is meant that the polymer repeat unit, or a branch thereof is extended by carbon atoms, preferably from 1 to 4 carbon atoms. For example, a related polymer of acrylic acid is one in which the vinyl group is extended by one carbon to form an allyl group. The polymer salt is an alkali metal salt, and preferably the sodium salt. Still further preferred polymers are those that provide the HF compositions with a thixotropic rheology, so that the compositions are fluid when applied to the substrate surface, but resist flow once at rest.

Preferably, a synthetic water-soluble polymer is used. More preferably, polyacrylic acid or one of its alkali metal salts is used. Most preferably, the water-soluble polymer is sodium polyacrylate.

The polymer may be combined with the HF in any suitable corrosion-resistant vessel. The HF and polymer are blended by shaking, stirring or otherwise mixing the two components in a corrosion-resistant vessel until a uniform, homogenous mixture is obtained. Preferably, a polymer is selected into which the HF dissolves. Because HF has a relatively low vapor pressure, a mixing temperature is selected to minimize HF evaporation. A mixing temperature between about 0 and about 25° C. is preferred. Depending upon the viscosity desired for the finished product, the polymer is blended with either anhydrous HF or an aqueous HF solution. One of ordinary skill in the art will understand that the mixing temperature will thus depend upon whether anhydrous HF with a boiling point of 19° C. is employed, or aqueous HF with a higher boiling point is used.

The quantity of HF required to perform the desired etch or oxide removal may be calculated and added to the polymer, so that after the etching or oxide removal is complete no residual HF remains. The weight of the substrate to be removed by etching, or the oxide scale to be removed is determined by volumetric measurement, and a stoichiometric quantity of HF is used. For example, with silicon-containing substrates to be etched, $SiF_4$, a gas, is formed. Thus, four moles of HF are employed for every mole of Si to be removed. The number of moles of Si to be removed are determined from the density and Si-content of the volume of substrate to be removed by etching. These calculations are within the ability of the ordinarily skilled artisan. Similar calculations apply to the removal of oxide scale by the formation of fluorine-oxygen compounds.

Etching and oxide scale removal compositions in accordance with the present invention typically contain between about 10 and about 30% by weight HF, and preferably between about 15 and about 25% by weight HF. Anhydrous HF can be employed, or the HF can be mixed with the polymer in the form of an aqueous solution containing HF.

The etching methods of the present invention can be employed with essentially any substrate having an HF-etchable surface. Examples of such substrates include glass, silica, and substrates having a surface coating of glass or silica (such as a video display). The method is particularly useful for etching silica wafers. The method applies an effective amount of the HF composition capable of producing the desired degree of etch to the substrate to be etched for the desired time. Essentially, the stoichiometric amount determined as described above to remove the desired quantity of substrate is applied. The entire surface may be coated or the composition may be applied in a predetermined pattern. The predetermined pattern may be applied with or without a mark or resist covering the areas to remain pattern-free.

Oxide scale removal methods in accordance with the present invention apply an effective amount of the HF composition capable of producing the desired degree of oxide scale removal to an oxidized substrate for the desired time. The method is suitable for use with essentially any substrate that undergoes oxidation. In most situations, the substrate will be an oxidized metal.

The application temperature may be increased or decreased to decrease or increase the etching or oxide scale removal time as desired. As the desired etch or oxide removal is attained, the remaining composition can be removed such as by rinsing or wiping with water. For example, the HF-depleted composition can be rinsed with water, forming an HF waste with much smaller HF content, which optionally can be neutralized by the addition of base. Alternatively, the remaining HF in the HF-depleted composition can be removed by any of the methods disclosed by U.S. Pat. No. 5,766,483, the disclosure of which is incorporated by reference, for example, by heating the composition to about 80° to about 125° C. using hot gas. This could also be accomplished by heating the substrate. The residual HF that is removed can then be recycled or scrubbed safely by methods that are also disclosed by the above-referenced After either procedure, the residual polymer can then be dried and reconstituted with HF to produce more etching or oxide removal composition.

To attain fine, variable direction lines with the etching method of the present invention, an etching composition having the theological flow properties of an ink can be formulated using polymer ink binders. The etching composition can be drawn in the form of the pattern on a substrate with a pen containing the ink, provided that the pen is assembled from HF-resistant components. Ink-type etching compositions can also be applied to substrates by other essentially conventional printing techniques such as silk screening, direct and offset printing, including gravure printing, with conventional equipment having HF-resistant ink contacting surfaces.

With higher molecular weight polymers (e.g., polymers having weight-average molecular weights of 1,000,000 daltons and higher), compositions may be formulated that are capable of being shaped into a crayon or the "lead" of a grease pencil, to provide a writing implement for use with either the substrate etching or oxide scale removal methods of the present invention. Etching methods of the present invention in which the etching composition is applied with a writing implement can be employed in security end-use applications in which parts are etched to indicate an identifying number or code. The etching method can also be employed for freehand drawing of patterns or numbers.

HF compositions may also be prepared with polymers selected to provide the rheological properties of paint, so that the etching and metal oxide scale removal compositions may be applied with a paint brush. Etching and metal oxide scale removal compositions formulated as inks, paints, crayons or grease pencil leads may also contain a dye, ink or other coloring additive to enhance the visibility of the composition on the surface to which it is applied. Such ingredients are conventional and can be readily identified by those of ordinary skill in the art. Etching and oxide scale removal compositions employed in the methods of the present invention may also contain other conventional ink and paint additives.

The invention will be clarified further by a consideration of the following examples that are purely exemplary.

EXAMPLES

Comparative Example

A small sample of aqueous HF solution (4.9% HF) was placed on an inclined sheet of glass. The liquid did not remain where it was applied, and instead, flows freely down the glass and etched all the glass which it contacted.

Example 1

100 g anhydrous HF was added to 10 g sodium polyacrylate having a weight-average molecular weight of about 1,000,000 daltons to make a 9.1 wt. % polymer/HF mixture. A small sample of the 9.1% polymer/HF mixture was placed on an inclined sheet of glass. The material flowed partway down the glass and evaporated with a white cloud, leaving behind a white residue. The glass was etched.

Example 2

Example 1 was repeated, but with sufficient anhydrous HF to make a 16.3% polymer/HF mixture. The polymer/HF mixture remained stationary on the inclined glass. It fumed and etched the glass.

Example 3

Example 1 was repeated, but with sufficient anhydrous HF to make a 23.2% polymer/HF mixture. It had a gelatin-like consistency, and did not throw or move when applied. When the polymer/HF mixture was removed from the glass, the glass had been etched.

Example 4

Example 1 was repeated, but instead of using anhydrous HF, a 4.9% aqueous HF solution was used. Enough of the aqueous HF was used to make a 15% polymer/HF mixture. The material was easy to apply to the glass and did not fume. It remained in a fixed location on the inclined glass. When removed, the glass was etched.

Example 5

The procedure of example 1 is used, except that a paste is prepared with polyvinyl alcohol, m.wt. 500,000 as a substitute for sodium polyacrylate. The resulting paste is used to etch glass as in example 1.

Example 6

The procedure of example 1 is used, except that polyvinyl pyrrolidone m.wt. 50,000 is substituted for the sodium polyacrylate of example 1. The resulting composition is used to etch glass as in example 1.

Example 7

The procedure of example 1 is followed, except polymethacrylic acid, m.wt. 250,000 is substituted for the sodium polyacrylate of example 1. The resulting composition is used to etch glass as in example 1.

Example 8

The procedure of example 1 is used, except polyethylene oxide, m.wt. 150,000 is substituted for the sodium polyacrylate of example 1. The resulting composition is used to etch glass as in example 1.

Example 9

The procedure of example 1 is used, except polyacrylamide, m.wt. 100,000 is substituted for the sodium polyacrylate of example 1. The resulting composition is used to etch glass as in example 1.

Example 10

The procedure of example 1 is used, except ethylene ethyl acrylate, m.wt. 500,000 is substituted for the sodium polyacrylate of example 1. The resulting composition is used to etch glass as in example 1.

Example 11

The procedure of example 1 is used, except ethylene vinyl acetate, m.wt. 300,000 is substituted for the sodium polyacrylate of example 1. The resulting composition is used to etch glass as in example 1.

Example 12

The procedure of example 1 is used, except a 50:50 wt./wt. mixture of sodium polymethacrylate (m.wt. 1,000,000) and polymethacrylic acid (m.wt. 1,000,000) is substituted for the sodium polyacrylate of example 1. The resulting composition is used to etch glass as in example 1.

Example 13

A mixture of sodium polyacrylate and HF is prepared as in Example 3. The composition is brushed on an oxidized steel coupon. It is easy to apply, does not fume, and remains in a fixed location when the coupon is inclined. When removed, the steel coupon is free of oxidation.

What is claimed is:

1. A method for etching a substrate comprising applying to the substrate a composition in the form of a liquid, paste, solid or gel consisting of a water-soluble polymer and an amount of anhydrous hydrofluoric acid (HF) effective to etch said substrate; and maintaining said composition on said substrate until said substrate is etched by said composition.

2. The method of claim 1, wherein said water-soluble polymer is selected from the group consisting of semi-synthetic water-soluble polymers, synthetic water-soluble polymers and mixtures thereof.

3. The method of claim 1, wherein said water-soluble polymer comprises a synthetic water-soluble polymer selected from the group consisting of polyacrylimide, polyacrylic acid, polyacrylic acid salts, polyethylene oxide, polymethacrylic acid, polymethacrylic acid salts, polyethacrylic acid, polyethacrylic acid salts, esters of polyacrylic, polymethacrylic and polyethacrylic acids, polyvinyl acetate, polyethylene amine, polyvinyl alcohol, polyvinyl pyrrolidone and copolymers thereof.

4. The method of claim 1, wherein said water-soluble polymer has a weight-average molecular weight between about 5,000 and about 10,000,000 daltons.

5. The method of claim 1, wherein said composition comprises from about 10 to about 30% by weight of HF.

6. The method of claim 1, wherein said composition is applied to said substrate in the form of a pattern having a predetermined shape.

7. The method of claim 6, wherein said composition is applied without using a mask or a resist.

8. The method of claim 6, wherein said composition is applied using a mask or a resist.

9. The method of claim 6, wherein said composition is applied to said substrate by a printing process.

10. The method claim 6, wherein said composition is applied to said substrate by a writing implement.

11. The method of claim 1, wherein said substrate has a glass or silica surface.

12. The method of claim 11, wherein said substrate is a silica wafer.

13. The method of claim 1, further comprising the step of removing said composition from said substrate.

14. The method of claim 13, wherein said composition is removed from said substrate by rinsing or wiping said substrate with water.

15. The method of claim 14, wherein, before said step of rinsing or wiping said substrate, said method further includes the step of heating said composition to remove any excess HF.

16. The method of claim 14, wherein, before said step of rinsing or wiping said substrate, said method further includes the step of adding a base to said composition to neutralize any excess HF.

17. The method of claim 14, wherein after said step of rinsing or wiping said substrate, said method further includes the step of recovering said polymer.

18. The method of claim 17, wherein said recovered polymer is reconstituted with HF to regenerate said composition.

19. A method of removing oxide scale from an oxidizable substrate comprising applying to the substrate a composition in the form of a liquid, paste, solid or gel consisting of a water-soluble polymer and an amount of anhydrous hydrofluoric acid (HF) effective to remove at least a portion of said oxide scale; and maintaining said composition on said substrate until at least a portion of said oxide scale is removed.

20. The method of claim 19, wherein said water-soluble polymer is selected from the group consisting of semi-synthetic water-soluble polymers, synthetic water-soluble polymers and mixtures thereof.

21. The method of claim 20, wherein said water-soluble polymer is a synthetic water-soluble polymer selected from the group consisting of polyacrylimide, polyacrylic acid, polyacrylic salts, polyethylene oxide, polymethacrylic acid, polymethacrylic acid salts, polyethacrylic acid, polyethacrylic acid salts, esters of polyacrylic, polymethacrylic and polyethacrylic acids, polyvinyl acetate, polyethylene amine, polyvinyl alcohol, polyvinyl pyrrolidone and copolymers thereof.

22. The method of claim 19, wherein said water-soluble polymer has a weight-average molecular weight between about 5,000 and about 10,000,000 daltons.

23. The method of claim 19, wherein said composition comprises from about 10 to about 30% by weight of HF.

24. The method of claim 19, wherein said substrate has an oxidizable metal surface.

25. The method of claim 19, further comprising the step of removing said composition from said substrate.

26. The method of claim 25, wherein said composition is removed from said substrate by rinsing or wiping said substrate with water.

27. The method of claim 26, wherein, before said step of rinsing or wiping said substrate, said method further includes the step of heating said composition to remove any excess HF.

28. The method of claim 26, wherein, before said step of rinsing or wiping said substrate, said method further includes the step of adding a base to said composition to neutralize any excess HF.

29. The method of claim 26, wherein after said step of rinsing or wiping said substrate, said method further includes the step of recovering said polymer.

30. The method of claim 29, wherein said recovered polymer is reconstituted with HF to regenerate said composition.

* * * * *